(12) United States Patent
Hanaoka et al.

(10) Patent No.: US 7,323,644 B2
(45) Date of Patent: Jan. 29, 2008

(54) APPARATUS FOR MEASURING WEIGHT OF POWDERED AND GRANULAR MATERIALS

(75) Inventors: Kazunari Hanaoka, Hirakata (JP); Takayuki Okuda, Hirakata (JP); Hiroshi Hara, Hirakata (JP)

(73) Assignee: Kabushiki Kaisha Matsui Seisakusho, Osaka (JP)

( * ) Notice: Subject to any disclaimer, the term of this patent is extended or adjusted under 35 U.S.C. 154(b) by 170 days.

(21) Appl. No.: 11/243,362

(22) Filed: Oct. 4, 2005

(65) Prior Publication Data

US 2007/0075090 A1    Apr. 5, 2007

(51) Int. Cl.
*G01G 13/00* (2006.01)

(52) U.S. Cl. .................. 177/60; 177/116; 177/142; 177/DIG. 9

(58) Field of Classification Search ............. 177/60, 177/116, 119, 142, 145, DIG. 9
See application file for complete search history.

(56) References Cited

U.S. PATENT DOCUMENTS

| 5,753,868 A | * | 5/1998 | Diem | 177/70 |
| 6,472,615 B1 | * | 10/2002 | Carlson | 177/16 |
| 6,911,607 B2 | * | 6/2005 | Klijn | 177/116 |

* cited by examiner

*Primary Examiner*—Randy W Gibson
(74) *Attorney, Agent, or Firm*—William L. Androlia; H. Henry Koda

(57) ABSTRACT

A weight measuring apparatus housing therein a load cell for measuring the weight of material stored in a material storage tank in which the tank has a material feeding opening. The tank includes a shoulder frame fixed to only the tank and a support arm penetrating through the tank so as not to contact the tank and firmly supported at its both ends at the outward of the tank, and a load cell provided so as to be directly supported between the shoulder frame and the support arm.

5 Claims, 3 Drawing Sheets

APPARATUS FOR MEASURING WEIGHT OF POWDERED AND GRANULAR MATERIALS

FIELD OF THE INVENTION

The present invention relates to a weight measuring apparatus housing a load cell capable of accurately measuring the weight of material when a desirable material (for example powdered or granular material like synthetic resin material and so on) is charged and stored in a material storage tank with a discharge apparatus provided for a weight measuring apparatus.

PRIOR ART

It is well known to use a load cell as a weight converter for measuring the weight of several materials (solid material, liquid material, powdered or granular material and son on).

JP-A-2000-46636 discloses a weight measuring apparatus for a powder material using a load cell in which powder material, such as leaf tobacco, is stored in a material storage tank and the total amount is measured to determine the weight of powder material.

JP-A-2-253835 discloses a weight measuring apparatus in which a suspension type material storage tank with a material charge port supported by a weight sensor as a part of a mixing apparatus provided with a weight sensor.

These weight measuring apparatus have the following problems:

According to the former weight measuring apparatus, there is a problem that nothing but a so-called batch process is executed for measuring the weight of powder material stored in the material storage tank.

Namely, after the weight of powder material stored in the material storage tank is measured, the material storage tank, which has completed measuring, has to be exchanged with other material storage tank for storing the other powder material for measuring the other powder material or the material storage tank is removed from the weight measuring apparatus after measurement, the stored powder material is discharged, and another powder material is charged to measure its weight.

In this case, there are problems that much labor and time are required for executing the above-mentioned procedures every time powder material is measured and also measurement of the weight of powder material is not continuously executed.

On the other hand, according to the latter apparatus, a discharge shutter is provided for the material storage tank for discharging the stored material, so that the above-mentioned problem is solved.

However, according to this apparatus, the material storage tank is suspended and supported by means of a lifting lug provided above and outside of the tank, so that the tank is constructed so as to be supported at a point which is remote from the center of gravity of the material storage tank and is outside of the tank.

Therefore, there is a problem that an accidental error is apt to be caused when measuring the weight of material storage tank and the weight of stored material is not accurately measured.

Further, there is a problem that the lifting lug and so on are provided outside of the material storage tank, so that the load cell externally provided for the material storage tank will suffer from inadvertent vibration and shock during transportation of the weight measuring apparatus.

SUMMARY OF THE INVENTION

The present invention is proposed to solve the above-mentioned problems and provides a weight measuring apparatus housing a load cell capable of measuring the weight of charged material or discharged material which is supported near the center of gravity of the material storage tank by means of a load cell.

In order to achieve the object, the present invention proposes a weight measuring apparatus housing a load cell therein for measuring the weight of material stored in a material storage tank in which the tank has a material feeding port. The apparatus is comprised of a shoulder frame provided in the tank so as to be fixed only to the tank, a support arm penetrating through the tank so as not to contact with the shoulder frame and firmly supported at both ends outward of the tank, and a load cell provided between the shoulder frame and the support arm so as to directly support the shoulder frame.

According to the apparatus, the support frame is formed above and provided so as not to touch the weight measuring apparatus so as not to receive the load of weight measuring apparatus. The load cell is provided at an appropriate position of the support arm and supports the shoulder frame provided in the material storage tank, so that the entire load of weight measuring apparatus is applied on the load cell in the material storage tank.

According to such construction, the load cell is provided near the center of gravity of the weight measuring apparatus, thereby measuring the weight of charged material with high accuracy.

Further, because the load cell is provided in the material storage tank, it is not damaged during transportation.

Further, according to the present invention, a discharge apparatus for discharging the material stored in the material storage tank is further provided with the material storage tank.

The discharge apparatus is provided for discharging the material stored in the material storage tank, so that the stored material can be discharged via the material discharge apparatus. As the weight of charged material does not relate to the weight of material discharged by means of the discharge apparatus, the apparatus corresponds to either one of a batch process system or a loss-in-weight system to continuously charge and discharge the material, thereby improving the operational efficiency.

Still further according to the present invention, the shoulder frame has a steeple roof.

The shoulder frame in the material storage tank is provided with the steeple roof at the top thereof, so that the charged material is prevented from stacking when passing through the shoulder frame.

Therefore, the weight of charged material is more accurately measured.

Still further, according to the present invention, the shoulder frame is a structure orthogonal to a vertical axis including the center of gravity of the weight measuring apparatus and the load cell is provided substantially directly under the center of structure.

The shoulder frame is so constructed as to be orthogonal to the vertical axis including the center of gravity of the weight measuring apparatus and the load cell is provided substantially directly under the center of the structure, so that the shoulder frame is desirably formed like a straight line or a cross lines.

DETAILED DESCRIPTION OF THE INVENTION

Figure 1:
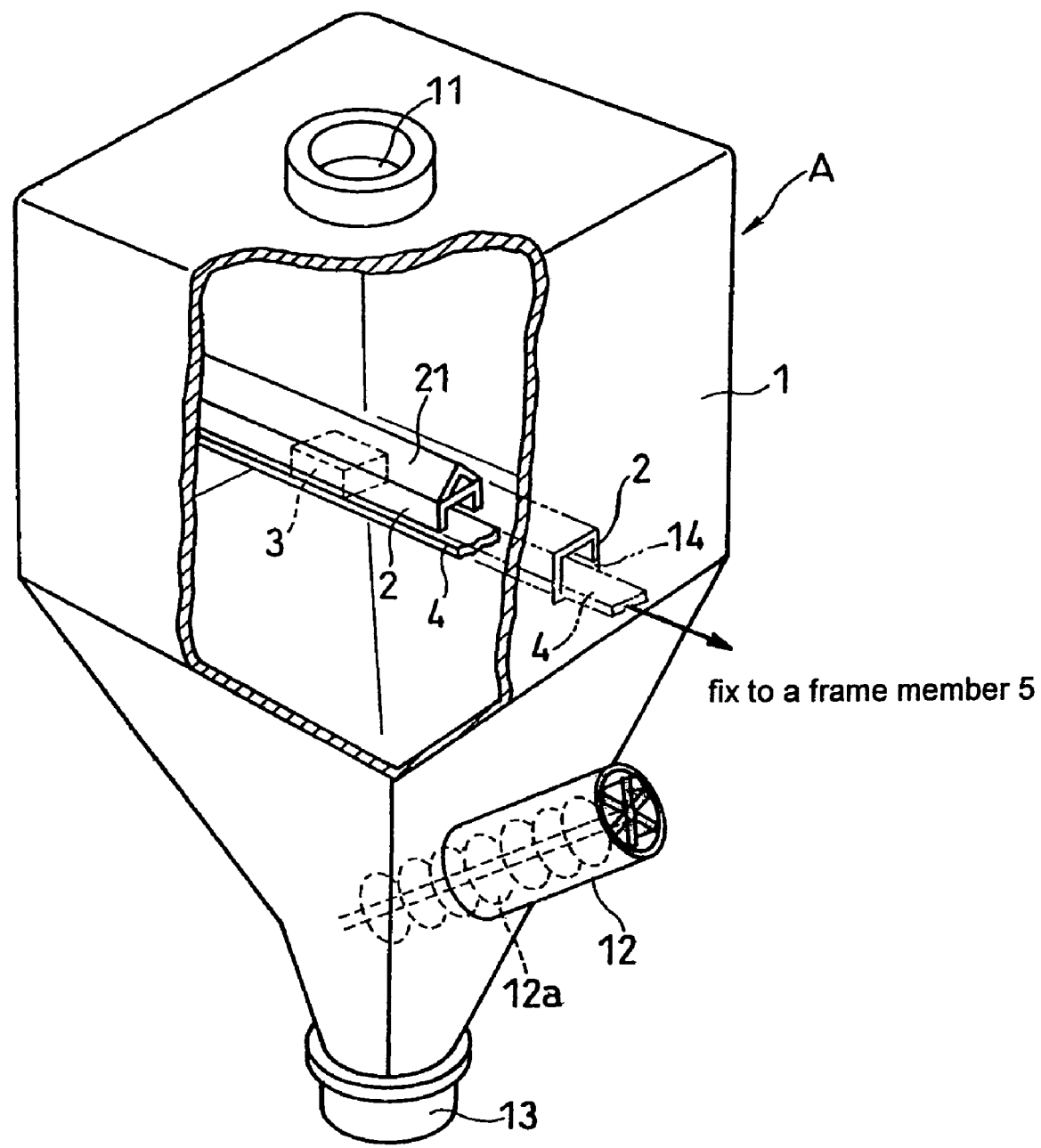
FIG. 1 is a partially broken, diagrammatical perspective view of one embodiment of a weight measuring apparatus housing a load cell A according to the present invention.

The present invention is explained referring to the attached drawings.

According to the weight measuring apparatus housing load cell A, a material charge port 11 is provided at the top end of a material storage tank 1 which is narrowed downwardly and a discharge apparatus 12 is provided at the lower end for discharging the material Z stored in the material storage tank 1. The material storage tank 1 is pending in a frame member 5 by means of a shoulder frame 2.

The material Z may be one which can be discharged via the discharge apparatus 12 and may be any one of solid material, fluid material, liquid material and so on. In this embodiment, powdered or granular resin material including powder, granule, minute flake, short fiber is used.

The discharge means or apparatus 12 is so constructed that the material Z stored in the material storage tank 1 is discharged out of the tank 1 by a rotary screw 12a having a driving means. However, other discharge means 12 which discharge material continuously or quantitatively may be used if it can discharge the material stored in the material storage tank 1.

Figure 2:
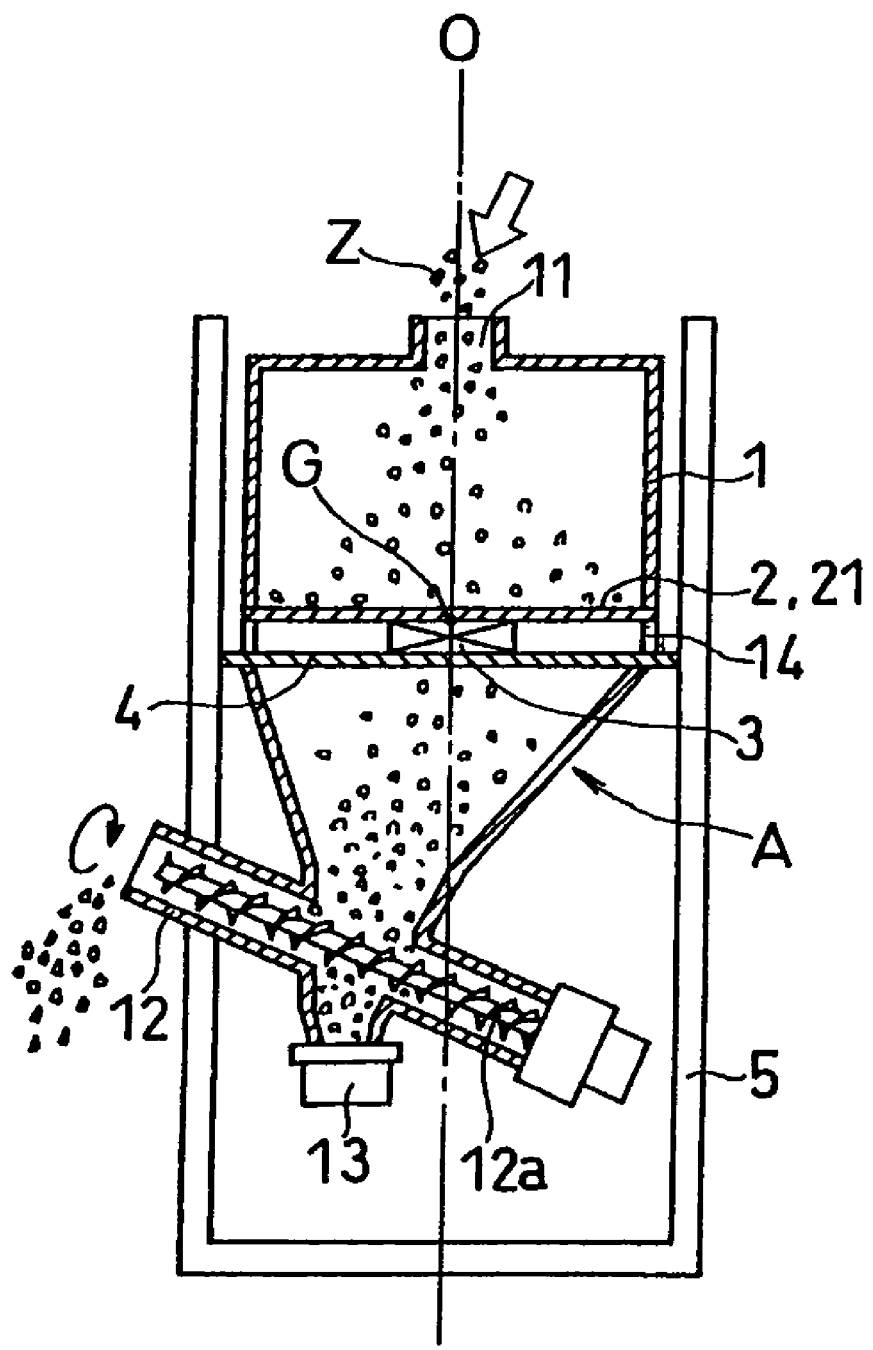
FIG. 2 is a vertical sectional view of FIG. 1 seen from the side.

The lower end of the material storage tank 1 is closed, however, an open-close cover 13 is preferably provided for easy maintenance or for appropriately discharging the material Z as shown in FIG. 1 and FIG. 2.

The shoulder frame 2, which is firmly fixed to nothing but the material storage tank 1, is provided inside the material storage tank 1.

Practically, openings 14 are provided for the facing side walls of the material storage tank 1 and both ends of the shoulder frame 2 are fixed to the edges of each opening by welding and so on, thereby integrating it with nothing but the material storage tank 1. The shoulder frame 2 may be a plate material, however in this embodiment, a C-type channel steel product which is opened downwardly is used to improve the strength.

Figure 3A:
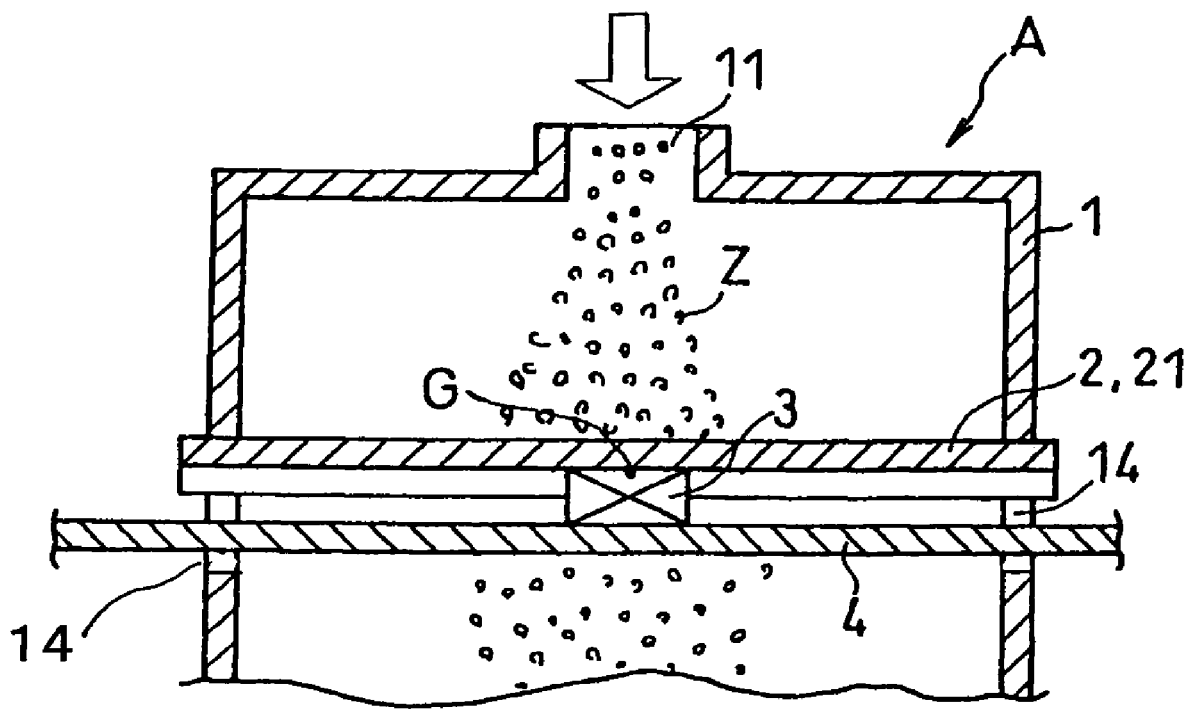
FIG. 3 is a diagrammatical sectional view of an enlarged essential part shown in FIG. 1 and FIG. 2, with FIG. 3a being a sectional view of the essential part seen from the side like FIG. 2, and FIG. 3b being a front view of the essential part.
Figure 3B:
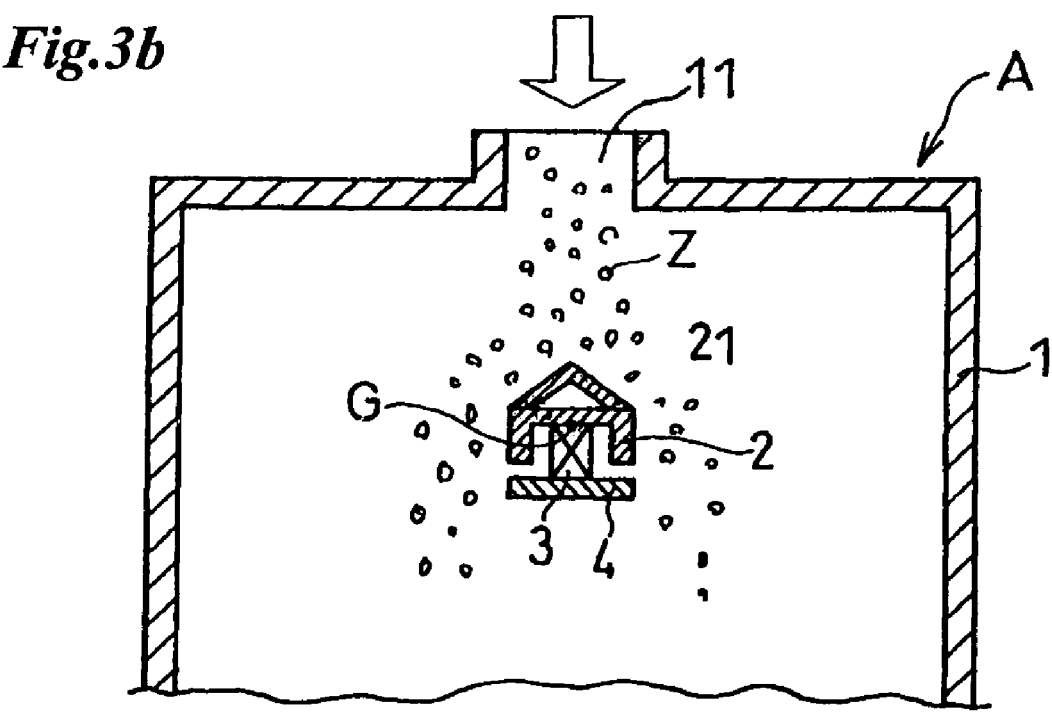

A roof 21 with a steeple top is provided above the shoulder frame 2 as shown in FIG. 1 and FIG. 3a. The material Z charged from the material charge port 11 is prevented from accumulating on the top of the shoulder frame 2 when it passes through the arm 2 by providing such a roof.

The shoulder frame 2 is provided like a straight line so as to penetrate a piece of C-type steel product through the material storage tank 1. If the material storage tank 1 is enlarged, two pieces of shoulder frame 2 may be provided in parallel or may be crossed in order to improve the strength.

In any case, the shoulder frame 2 is preferably a structure arranged in a horizontal direction orthogonal to the vertical axis O including the center of gravity center G of the weight measuring apparatus housing load cell A. The load cell 3, described later, is provided substantially and directly under the center of this constructed shoulder frame 2.

Both ends of the support frame 4 are fixedly supported at the outside of the weight measuring apparatus housing load cell A so as not to get in touch with the apparatus A.

Practically, a plate in parallel to and spaced with the shoulder frame 2 or the C-type channel steel product which is opened upwardly is used as the support frame 4. Such a support frame 4 passes through the openings 14, 14 of the material storage tank 1 while keeping a gap, both edges thereof are fixed by welding or by bolt and nut to the frame member 5 framed so as to cover the weight measuring apparatus housing load cell A, and the support frame 4 is cut so as not to touch the weight measuring apparatus housing load cell A.

The load cell 3 is arranged in such a manner that its measuring part (not shown) is provided on a desired position on the cut support frame 4, practically on a vertical axis O near the center of gravity G of the weight measuring apparatus housing load cell A. The substantial center of the shoulder frame 2 is supported only with the load cell 3. If there is gap between the load cell 3 and the shoulder frame 2 or the support frame 4, a spacer may be provided in order to bridge the gap.

According to such constructed weight measuring apparatus housing load cell A, the support frame 4 is designed to be provided not to touch the weight measuring apparatus housing load cell A in order not to directly receive the load of the weight measuring apparatus housing load cell A. The load cell 3 is provided near the center of gravity G on the support frame 4 to support the shoulder frame 2 only with the load cell 3. Therefore, the weight measuring apparatus housing load cell A is suspended and only the load cell 3 directly receives the entire load, so that the load cell 3 can measure the entire weight of weight measuring apparatus housing load cell A.

Such constructed the weight measuring apparatus housing load cell A is operated as follows:

Before the material Z is charged in the material storage tank 1, the load cell 3 receives only the load of weight measuring apparatus housing load cell A and at this time the load is set as the weight 0 (zero).

When the material Z is charged in the material storage tank 1 from the material charge port 11, the material Z falls through the shoulder frame 2 in the material storage tank 1 to be stored therein.

The weight of charged material Z is added on the weight of weight measuring apparatus housing load cell A. When the added weight is measured with the load cell 3, the weight of charged material Z can be measured.

The load cell 3 is positioned on the vertical axis O near the center of gravity G of the weight measuring apparatus housing load cell A, so that even if the charged material Z has unevenness in the material storage tank 1, the weight measuring apparatus housing load cell A can accurately measure the weight while keeping the balance from side to side.

On the other hand, after an appropriate amount of charged material Z is stored in the material storage tank 1, the discharge means 12 is operated, then the material Z stored in the material storage tank 1 is continuously discharged.

The weight of discharged material Z is subtracted from the entire amount of weight measuring apparatus housing load cell A contrary to the above. When the subtracted weight is measured with the load cell 3, the weight of discharged material Z can be calculated.

Thus, a desired weight of material Z can be continuously charged and discharged according to the present invention, and in addition, the weight can be accurately measured, thereby improving operational efficiency.

As mentioned above, the present invention can be effectively used as a weight measuring apparatus housing load cell capable of accurately measuring the weight of charged or discharged material.

The invention claimed is:

1. A weight measuring apparatus housing therein a load cell for measuring the weight of material stored in a material storage tank in which the tank has a material feeding port, comprising:
   - a shoulder frame provided in said tank so as to be fixed only to said tank;
   - a support arm penetrating through said tank so as not to contact with said shoulder frame and firmly supported at its both ends outward of said tank; and
   - a load cell provided between said shoulder arm and said support frame so as to directly support said shoulder frame.

2. The weight measuring apparatus housing therein a load cell as set forth in claim 1, wherein a discharge apparatus for discharging the material stored in said material storage tank is further provided with said material storage tank.

3. The weight measuring apparatus housing therein a load cell as set forth in claim 1 or 2, wherein said shoulder frame has a steeple roof.

4. The weight measuring apparatus housing therein a load cell as set forth claim 1 or 2, wherein said shoulder frame is a structure orthogonal to a vertical axis including the center of gravity of said weight measuring apparatus and wherein said load cell is provided substantially directly under the center of structure.

5. The weight measuring apparatus housing therein a load cell as set forth claim 3, wherein said shoulder frame is a structure orthogonal to a vertical axis including the center of gravity of said weight measuring apparatus and wherein said load cell is provided substantially directly under the center of said shoulder frame.

* * * * *